US006783122B2

(12) United States Patent
Heine et al.

(10) Patent No.: US 6,783,122 B2
(45) Date of Patent: Aug. 31, 2004

(54) RAPID CLAMPING DEVICE

(75) Inventors: Werner Heine, Wiggensbach (DE); James R. Mattox, Rockford, IL (US)

(73) Assignee: Georg Kesel GmbH & Co. KG, Kempten (DE)

( * ) Notice: Subject to any disclaimer, the term of this patent is extended or adjusted under 35 U.S.C. 154(b) by 18 days.

(21) Appl. No.: 10/224,054

(22) Filed: Aug. 20, 2002

(65) Prior Publication Data

US 2003/0038416 A1 Feb. 27, 2003

(30) Foreign Application Priority Data

Aug. 22, 2001 (DE) ........................................ 101 40 191

(51) Int. Cl.[7] ................................................ B23Q 3/08

(52) U.S. Cl. ......................... 269/32; 269/172; 269/208; 269/210; 269/211

(58) Field of Search ................................ 269/210, 211, 269/208, 32, 27, 28, 30, 34

(56) References Cited

U.S. PATENT DOCUMENTS

| | | | | | |
|---|---|---|---|---|---|
| 1,529,281 | A | * | 3/1925 | Taylor | 269/208 |
| 2,656,820 | A | | 10/1953 | Becker | |
| 2,846,907 | A | | 8/1958 | Sprink | |
| 3,941,362 | A | * | 3/1976 | Arnold et al. | 269/32 |
| 4,067,560 | A | * | 1/1978 | Arnold et al. | 269/32 |
| 4,070,010 | A | * | 1/1978 | Brasca | 269/27 |

FOREIGN PATENT DOCUMENTS

| | | |
|---|---|---|
| AT | 24 04 72 | 8/1972 |
| CH | 3 71 767 | 8/1963 |
| DE | 1933755 | 1/1971 |
| DE | 2155806 | 5/1973 |
| DE | 2326546 | 5/1973 |
| DE | 29 28 167 A1 | 1/1981 |
| DE | 29 09 451 | 6/1982 |
| DE | 40 18 284 C1 | 4/1991 |
| DE | 40 11 107 A1 | 10/1991 |
| DE | 100 25 402 A1 | 11/2001 |

* cited by examiner

*Primary Examiner*—Robert C. Watson
(74) *Attorney, Agent, or Firm*—Notaro & Michalos, PC

(57) ABSTRACT

A clamping device (1), particularly a machine vice (1), has a body element (2), a jaw (3) attached thereto, and an oppositely placed movable jaw, for displacement by a drawbar (4). The drawbar has a compression bar to be arrested at varying distances from the fixed jaw, and a force amplifying arrangement (5) acting on the spindle. The force amplifying arrangement includes at least one cylindrical tube (9) and at least two plungers (10, 11) that are movable in concentric cylinders. Two compression chambers are provided, an outer, low-pressure chamber (12) and a high-pressure chamber (14) acting on the clamping plunger (11) from the direction of the drawbar, wherein a functional connection is established between the two plungers so that at least one rod (18) having a smaller diameter than the diameter of the plungers and connected to the outer compression plunger (10) acts on the high-pressure chamber (14), which is filled with pressurising medium, preferably oil or liquid grease.

18 Claims, 3 Drawing Sheets

B-B

RAPID CLAMPING DEVICE

The invention relates to a clamping device, particularly a machine vice, having a body element, a jaw immovably attached thereto, and an oppositely placed movable jaw, displacement of which is assured by a drawbar, which drawbar is furnished with a bearing member on which the movable jaw is supported by means of a compression bar, and the movable bar is configured so that it may be arrested with the compression bar at varying distances from the fixed jaw, and in which a force amplifying arrangement is provided.

A machine vice having a force amplifying arrangement is known in the art. The movable jaw is moved against the work piece to be clamped by rotation of an externally threaded sleeve.

A coaxially arranged spindle then acts on a force amplifying arrangement, which creates the necessary clamping force between the fixed and the movable jaws. The hydraulic force amplifying arrangement is located beneath the fixed jaw in the body element. The free extremity of the compression bar forms the primary plunger, which projects into an interior chamber filled with hydraulic fluid. When the primary plunger is moved to the left, hydraulic fluid is forced out of the interior chamber and into a cylinder, pushing a secondary plunger to the left. The surface area of the secondary plunger is significantly greater than that of the primary plunger, so that the transmitted force is amplified. The force exerted in the leftward direction by the secondary plunger is transferred to the spindle, which creates a high tensile force on the spindle. The primary and secondary plungers are arranged in line and always move in the same direction. The construction of the machine vice is accordingly long, which is disadvantageous.

The object of the present invention is to describe a clamping device that is as compactly configured as possible.

The object is solved with a clamping device according to the definition of the species wherein the force amplifying arrangement includes at least one cylindrical tube and at least two plungers that are movable in concentric cylinders, an outer compression plunger and a clamping plunger—preferably attached to the drawbar by a plunger rod—and wherein two compression chambers are provided, an outer, low-pressure chamber and a high-pressure chamber acting on the clamping plunger from the direction of the drawbar, so that a functional connection is established between the two plungers in such manner that at least one rod having a smaller diameter than the diameters of the plungers and which is connected to the outer compression plunger acts on the high-pressure chamber, which is filled preferably with oil or liquid grease. With the proposed construction, it is possible to produce a very short machine vice.

An advantageous simplification in the manufacture of such devices may be achieved if the plungers have the same diameter. This naturally means that the cylindrical tubes must also have the same diameter. This provision allows a degree of standardisation in production.

According to one advantageous configuration, the plungers are arranged in the same cylinder. The single cylinder thus serves as a guide for both plungers. The number of components included in the device is thus reduced by one.

The overall length of the machine vice may be shortened advantageously if the plungers are movably configured facing one another. During clamping, the compression plunger that is moved by the low-pressure chamber advances towards the clamping plunger, which itself advances towards the compression plunger. The gap between the compression plunger and the clamping plunger is connected with the external atmosphere via a hole, so that a build-up of pressure is advantageously avoided.

The force amplifying arrangement is advantageously disposed below the fixed jaw so that it functions as a tractive force amplifying arrangement. Arranging the force amplifying arrangement in the region of the movable jaw would necessitate a longer machine vice.

According to an advantageous improvement of the invention, the force amplifying arrangement is constructed so as to be detachable from the clamping device in the direction of the fixed jaw. This requires that the diameters of the individual components are constructed in tapered manner from the left exterior side of the machine vice towards the opposing side.

Against the event that very high clamping pressures are required, it is advantageously foreseen that the pressurising medium in the high-pressure chamber is oil or liquid grease. Liquid grease has the advantage that it may be insulated considerably more easily from the other components and the atmosphere.

Since compressors are available in all workshops to produce output air pressure up to 10 bar, in an advantageous arrangement the pressurising medium in the low-pressure chamber may be a gas, preferably air or compressed air.

For purposes of automating the machine vice according to the invention, it may be advantageously constructed so that the pressurising medium in the low-pressure chamber is oil or liquid grease. One option for pressurising may consist in the use of pumps. It would then be possible to control the oil pressure in the low-pressure chamber via the pumping capacity.

In order to achieve the simplest possible construction of the machine vice according to the invention, a hole may be advantageously provided preferably centrally on the clamping plunger adjacent the drawbar, through which a rod connected to the outer, compression plunger and establishing the functional connection projects into the high-pressure chamber. As soon as the low-pressure chamber is pressurised, the compression plunger moves with the attached rod towards the clamping plunger. The rod, whose diameter is considerably smaller than that of the compression plunger, is projected farther into the high-pressure chamber, so that the pressure in the high-pressure chamber rises, and the clamping plunger moves towards the compression plunger. At the same time, the clamping plunger exerts a corresponding tractive force on the drawbar. Tilting and twisting effects are advantageously prevented by the central arrangement of the hole. Moreover, the guidance of the compression plunger is assured at the same time by the guidance of the rod in the central hole.

In a particularly practical configuration, the rod has the form of a hollow rod with an interior pressure adjustment mechanism for adjusting the pressure in the high-pressure chamber. The constant movement of the clamping plunger causes losses due to slippage in the area of the seals. This in turn necessitates subsequent adjustment of the pressure in the high-pressure chamber. This pressure adjustment mechanism advantageously comprises a displacement plunger that may be twisted towards the high-pressure chamber on a screw thread. This increases the pressure of the pressurising medium in the high-pressure chamber.

One essential measure to avoid bouncing effects when the high-pressure chamber is pressurised is advantageously the provision of vent screw to allow air to escape from the high-pressure chamber. Maximum pressures may only be achieved with a high-pressure chamber from which all air has been purged.

To ensure that the vent screw when applied occupies as little room as possible, it is advantageously provided that the vent screw is disposed between a space leading to the atmosphere between the two plungers and the high-pressure chamber. In order to fill the high-pressure chamber, the entire machine vice is rotated from its horizontal operating position into a vertical position. The vent screw is then located at the top end of the high-pressure chamber, thus assuring complete venting.

Since friction occurs when the machine vice is in use, it is advantageously provided that at least one return spring be disposed to return the plungers to a starting position when they are not under pressure. The return spring is advantageously supported with its one spring surface on the tractive plunger and the opposing spring surface on the housing. It is particularly advantageous to arrange multiple return springs in a circle.

One advantageous configuration of the machine vice provides that the force amplifying arrangement includes a cylindrical tube and a clamping plunger that travels inside the cylindrical tube, and that a high-pressure chamber acting on the clamping plunger from the direction of the drawbar is provided and may be pressurised directly with pressurising medium, preferably oil or liquid grease. This configuration is particularly suitable for automating the machine vice. The requisite clamping pressure is supplied by a hydraulic system that introduces the pressuring medium directly into the high-pressure chamber via a delivery connection.

It is advantageously proposed that a device for measuring the pressure in the high-pressure chamber be provided. If the pressure in the high-pressure chamber is determined, the clamping pressure of the machine vice may be calculated and consequently introduction of the pressurising medium may also be automated. The actual pressure may be compared with the reference pressure by appropriate electronic means, so that errors may be detected which, for example, cause the machine tool to be switched off immediately.

An embodiment of the invention will be explained in detail with reference to the drawing.

Figure 1:
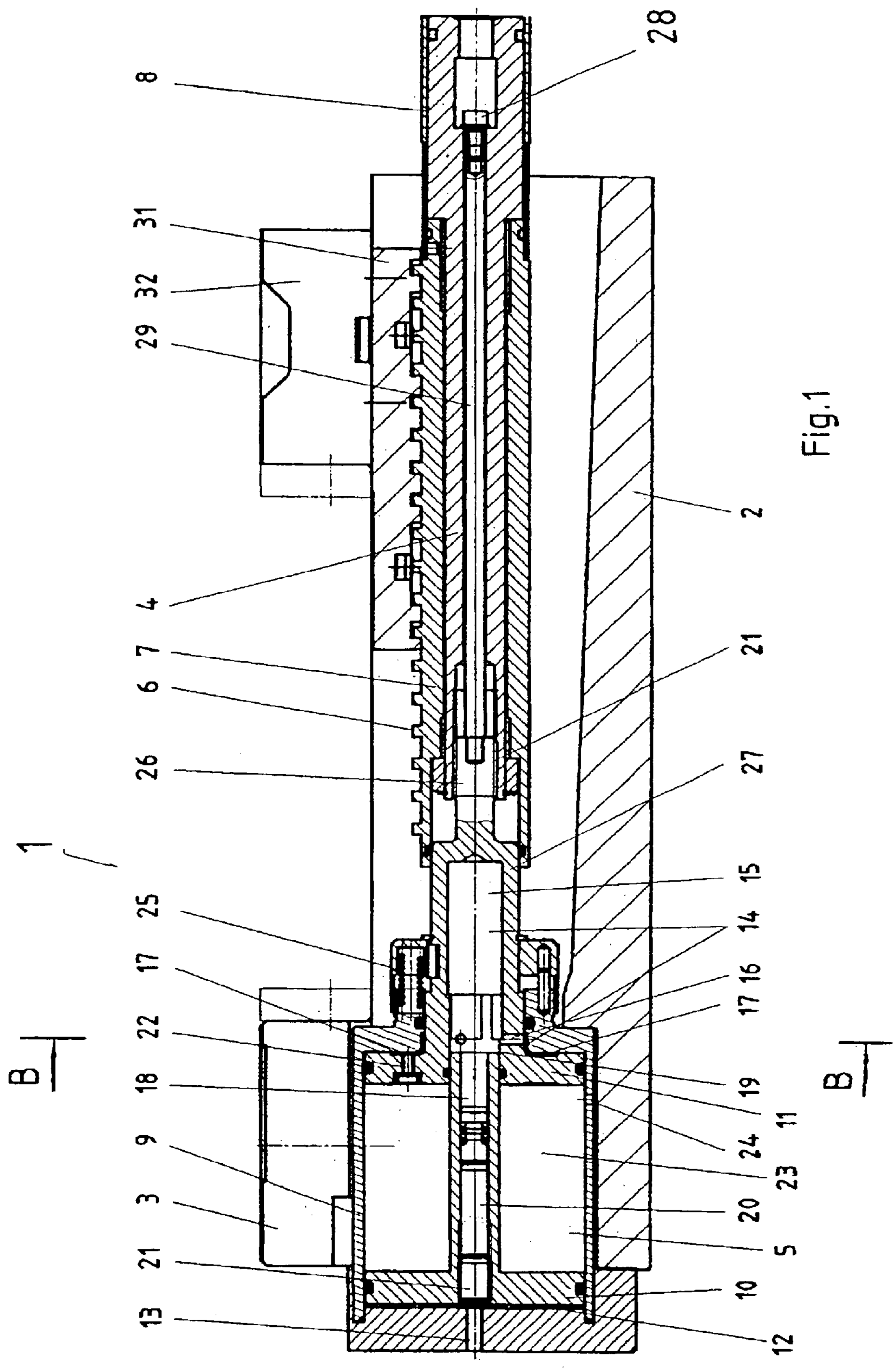
FIG. 1 is a sectional representation of the machine vice according to the invention with force amplifying arrangement.

In FIG. 1, 1 indicates the machine vice according to the invention. It includes a body element 2, at one extremity of which is arranged a fixed clamp jaw 3. A movable clamp jaw 32 is also located so as to be movable in body element 2. A work piece (also not shown) is clamped between the clamping faces of the jaws. The clamping forces created thereby are absorbed by a drawbar 4.

Drawbar 4 is attached by its leftmost extremity to a force amplifying arrangement 5. Movable jaw 32 is securely attached by positive engagement to a supporting element 31. Supporting element 31 is furnished with notches that engage with ridges 6 of a sleeve 7. This engagement assures that sleeve 7 and the supporting element attached to movable clamp jaw 32 are positively connected.

Drawbar 4 passes through sleeve 7 axially, and sleeve 7 rests on drawbar 4 in the region of the free extremity thereof, so that sleeve 7 acts as a pressure bar.

Sleeve 7 and drawbar 4 are rotatable with respect to each other. A grip 8 is rigidly attached to sleeve 7, so that the relative position of sleeve 7 may be altered by turning grip 8.

The clamping forces acting on movable jaw 32 are thus transferred to a supporting element 31, and from there to the support surfaces of ridges 6 via the notch faces closest to the fixed jaw. They are then transmitted to drawbar 4 by sleeve 7. The distribution of forces is then completed by drawbar 4 via force amplifying arrangement 5 and fixed clamp jaw 3.

Force amplifying arrangement 5 includes a cylinder 9 and two plungers that are arranged movably therein, a compression plunger 10 and a clamping plunger 11. The clamping plunger is connected to drawbar 4 via a fine adjustment mechanism 26.

Force amplifying arrangement 5 also includes an outer low-pressure chamber 12, which acts from the outside on compression plunger 10. An orifice 13 is provided on the outside of the machine vice the enable the introduction of pressurising media. In this embodiment, the pressurising medium on the low-pressure side is compressed air. This is applied in the pressure range from 1–7 bar.

In addition, a high-pressure chamber 14 acting on clamping plunger 11 is provided adjacent the drawbar. The high-pressure chamber comprises an oil chamber 15 configured as a hole and an annular plunger chamber 17 connected therewith via lateral apertures 16. In this embodiment, the pressurising medium used in high-pressure chamber 14 is liquid grease.

A functional connection exists between compression plunger 10 and clamping plunger 11. This functional connection has the form of a hollow rod 18. The hollow rod has a smaller diameter than the two equally dimensioned diameters of the compression and the clamping plungers. Hollow rod 18 is securely attached to compression plunger 10, and its distal extremity protrudes into high-pressure chamber 14.

If pressurising medium is introduced into low-pressure chamber 12 via orifice 13, compression plunger 10 moves towards clamping plunger 11. Hollow rod 18 is then advanced into high-pressure chamber 14, particularly into oil chamber 15. The pressurising medium is forced out of oil chamber 15 and through lateral apertures into annular plunger chamber 17. This causes clamping plunger 11 to move towards compression plunger 10. Clamping plunger 11 inevitably exerts a tractive force on drawbar 4, which is in turn transferred to the work piece via sleeve 7 and the movable clamping jaw (not shown). The two plungers thus move in opposing directions in the same cylindrical tube. Thus the most compact configuration of the complete machine vice is achieved.

Clamping plunger 11 adjacent the drawbar is furnished with a central hole 19 forming the oil chamber. Hollow rod 18, which is attached to outer compression plunger 10, protrudes through this central hole 19 into high-pressure chamber 14. A pressure adjustment mechanism 20 for regulating the pressure in high-pressure chamber 14 is located inside hollow rod 18. Pressure adjustment mechanism 20 has the form of an adjustable plunger. This adjustable plunger may be displaced within hollow rod 18 be means of a screw thread 21.

The entire force amplifying arrangement 5 is configured in such manner that it may be detached from the fixed jaw side of the machine vice. This is facilitated by the fact that the two plungers have the same diameter. At the same time, the complete drawbar 4 may also be removed from this side because of its smaller diameter. This is of particular advantage for the performance of maintenance work.

An essential requirement for flawless functioning of the machine vice is that no air be trapped in the high-pressure chamber. A vent screw 22 is provided for this purpose. This vent screw 22 connects an interior space 23 between compression plunger 10 and clamping plunger 11 with high-pressure chamber 14 and annular plunger chamber 17. Interior space 23 is connected with the outside by an atmosphere opening.

Return springs 25 are advantageously provided on machine vice 1. These are supported on one side by drawbar 4 and on the other by the exterior of cylinder 9. Return springs 25 serve to ensure that the plungers return to their starting positions, thereby preventing losses due to slippage. The starting positions of both plungers are shown in the drawing. Since the intervals of rapid adjustment sleeve 7 are larger than the clamping travel of the force amplifying arrangement, a fine adjustment mechanism 26 was provided between drawbar 4 and plunger rod 27 of clamping plunger 11. With this arrangement, the clamping conditions are infinitely adjustable. The gap between the movable clamping jaw and the work piece may be finely adjusted by rotating drawbar 4. To prevent drawbar 4 from being withdrawn from the thread of fine adjustment mechanism 26, a limit stop 28 having a stop bar 29 is integrated in drawbar 4.

Figure 2:
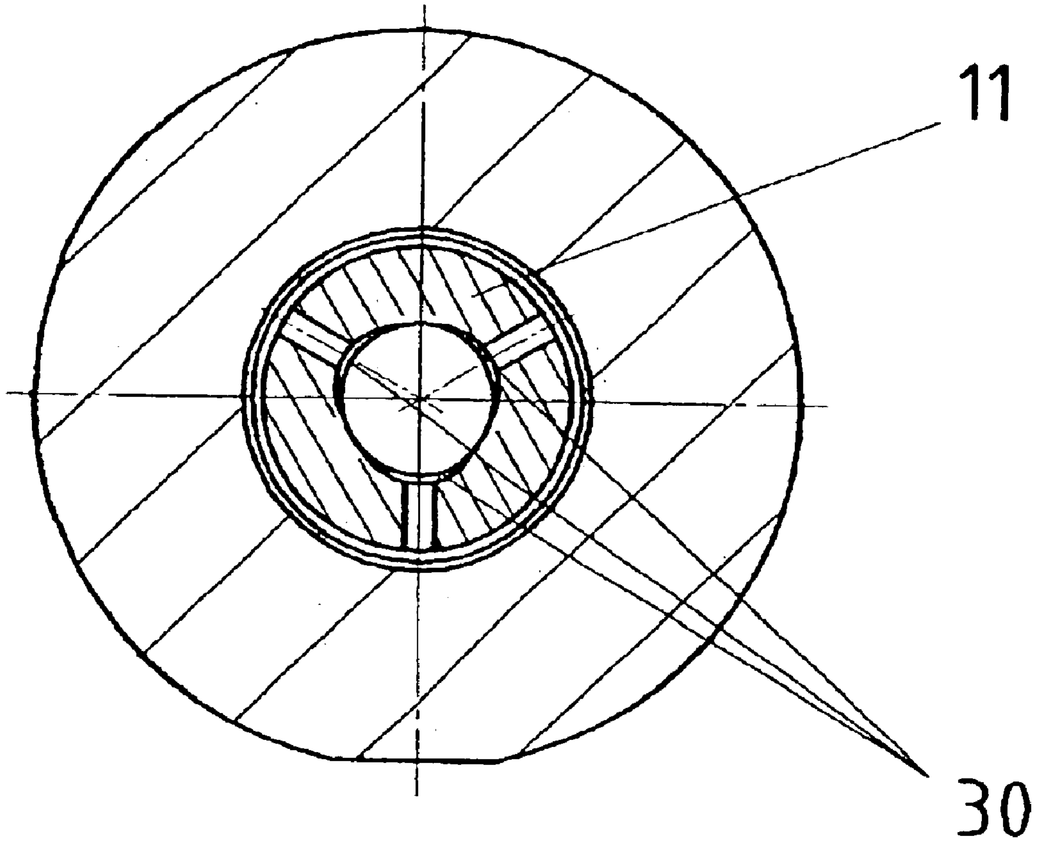
FIG. 2 is a view along line B—B in FIG. 1.

In FIG. 2, clamping plunger 11 is shown in section. Three tangential channels 30 are clearly illustrated, which ensure that hollow rod 18 of compression plunger 10 does not block lateral apertures 16 between oil chamber 15 and annular plunger chamber 17 when it protrudes into oil chamber 15.

Figure 3:
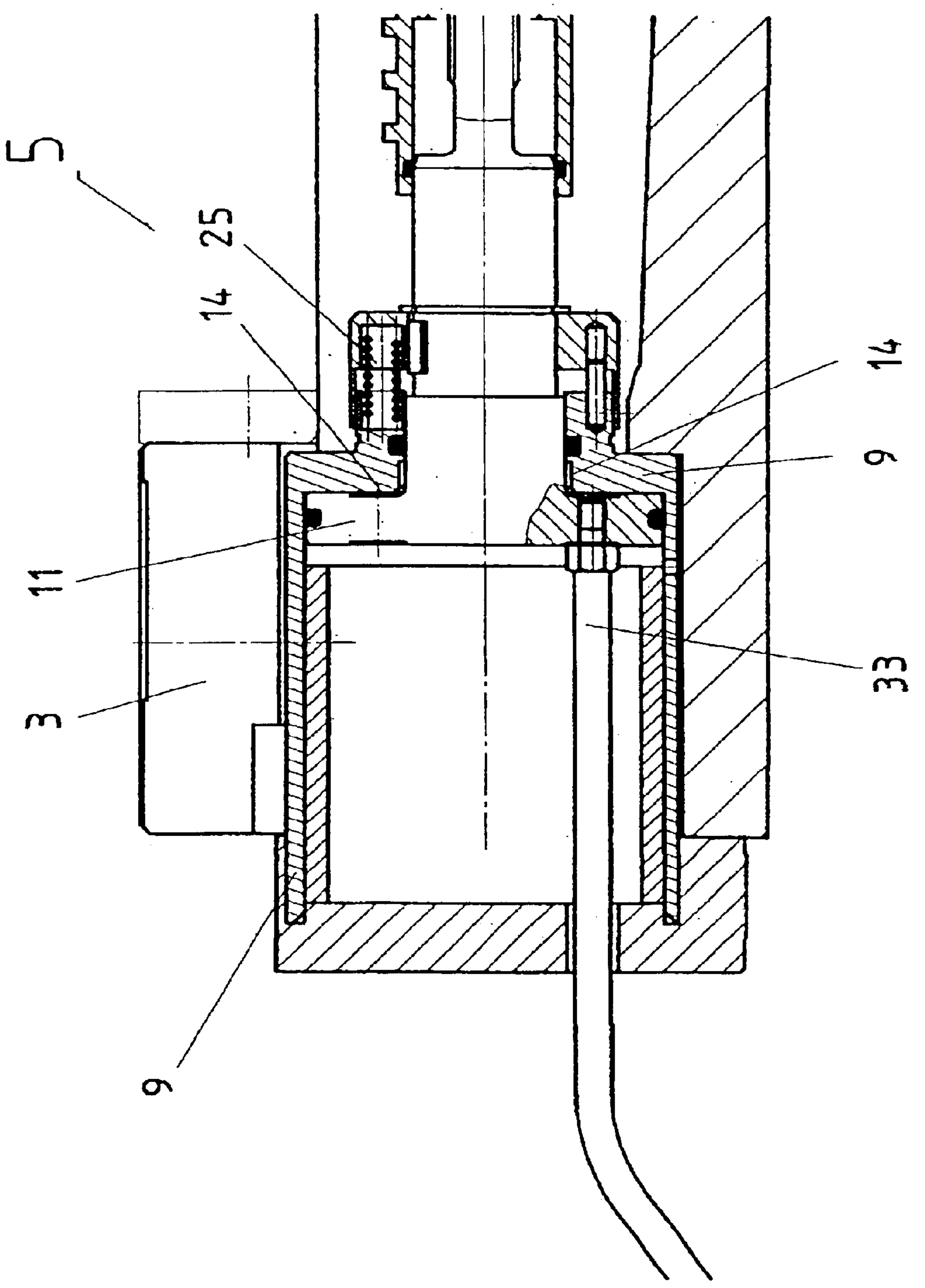
FIG. 3 is a sectional representation of the machine vice without the compression plunger.

FIG. 3 shows a further embodiment. Force amplifying arrangement 5 comprises a cylindrical tube 9 and a clamping plunger 11 that is movable inside cylindrical tube 9. In this refinement, the compression plunger serving as a pneumatic plunger is omitted. High-pressure chamber 14 acting on clamping plunger 11 from the direction of the drawbar is placed under pressure directly with pressurising medium. To this end, a delivery connection 33 is provided that terminates directly in high-pressure chamber 14 behind clamping plunger 11. It is proposed that a pressure gauge (not shown) be connected to high-pressure chamber 14. This pressure gauge may be used to calculate indirectly the clamping force that is acting on the work piece. With this advantageous configuration, operation of the machine vice may be fully automated.

| LEGEND | |
|---|---|
| 01 | Machine vice |
| 02 | Body element |
| 03 | Fixed clamp jaw |
| 04 | Drawbar |
| 05 | Force amplifying arrangement |
| 06 | Ridges |
| 07 | Sleeve |
| 08 | Grip |
| 09 | Cylinder |
| 10 | Compression plunger |
| 11 | Clamping plunger |
| 12 | Low-pressure plunger |
| 13 | Orifice |
| 14 | High-pressure chamber |
| 15 | Oil chamber |
| 16 | Lateral apertures |
| 17 | Annular plunger chamber |
| 18 | Hollow rod |
| 19 | Hole |
| 20 | Pressure adjustment mechanism |
| 21 | Screw thread |
| 22 | Vent screw |
| 23 | Interior space |

-continued

| LEGEND | |
|---|---|
| 24 | Atmosphere opening |
| 25 | Return springs |
| 26 | Fine adjustment mechanism |
| 27 | Plunger rod |
| 28 | Limit stop |
| 29 | Stop bar |
| 30 | Channel boreholes |
| 31 | Supporting element |
| 32 | Movable jaw |
| 33 | Delivery connection |

What is claimed is:

1. A clamping device, particularly a machine vice (1), having a body element (2), a jaw (3) immovably attached thereto, and an oppositely placed movable jaw (32), displacement of which is assured by a drawbar (4), which drawbar (4) is furnished with a bearing member on which the movable jaw is supported by means of a compression bar (7), and the movable jaw (32) is configured so that it may be arrested with the compression bar at varying distances from the fixed jaw, and in which a force amplifying arrangement is provided, characterised in that the force amplifying arrangement (5) includes at least one cylindrical tube (9) and at least two plungers that are movable in concentric cylinders, an outer compression plunger (10) and a clamping plunger (11) attached to the drawbar (4) by a plunger rod, and that two compression chambers (12, 14) are provided, an outer, low-pressure chamber (12) and a high-pressure chamber (14) acting on the clamping plunger (11) from the direction of the drawbar, wherein a functional connection is established between the two plungers (10, 11) in such manner that at least one rod (18) having a smaller diameter than the diameters of the plungers and which is connected to the outer compression plunger (10) acts on the high-pressure chamber (14), which is filled with pressurizing medium.

2. The clamping device according to claim 1, characterised in that the plungers (10, 11) have the same diameter.

3. The clamping device according to claim 1, wherein the at least one cylindrical tube (9) is a shared cylinder (9) and characterised in that the plungers (10, 11) are both disposed in the shared cylinder (9).

4. The clamping device according to claim 1 characterised in that the plungers (10, 11) are movably configured opposite one another.

5. The clamping device according to claim 1 characterised in that the force amplifying arrangement (5) is disposed on the side of the fixed jaw.

6. The clamping device according to claim 1 characterised in that the force amplifying arrangement (5) is constructed so that it may be detached from the clamping device in the direction of the fixed jaw (3).

7. The clamping device according to claim 1 characterised in that the pressurizing medium in the high-pressure chamber (14) is one of oil and liquid grease.

8. The clamping device according to claim 1 characterised in that the pressurizing medium in the low-pressure chamber (12) is gas.

9. The clamping device according to claim 1 characterised in that the pressurizing medium in the low-pressure chamber (12) is one of oil and liquid grease.

10. The clamping device according to claim 1 characterised in that the clamping plunger (10) adjacent the drawbar is furnished with a central hole (19), through which the rod (18) connected to the outer, compression plunger (10) and establishing the functional connection projects into the high-pressure chamber (14).

11. The clamping device according to claim 1 characterised in that the rod (18) is configured as a hollow rod having an interior pressure adjustment mechanism (20) for adjusting the pressure in the high-pressure chamber (14).

12. The clamping device according to claim 1 characterised in that a vent screw (22) for expelling air from the high-pressure chamber (14) is provided.

13. The clamping device according to claim 1 characterised in that the vent screw (22) is provided between a space (23) connected to the open atmosphere between the two plungers (10, 11) and the high-pressure chamber (14).

14. The clamping device according to claim 1 characterised in that at least one return spring (25) is provided that moves the plungers (10, 11) in the unpressurized state back to a starting position.

15. The clamping device, particularly a machine vice (1), having a body element (2), a jaw (3) immovably attached thereto, and an oppositely placed movable jaw (32), displacement of which is assured by a drawbar (4), which drawbar (4) is furnished with a bearing member on which the movable jaw is supported by means of a compression bar (7), and the movable jaw (32) is configured so that it may be arrested with the compression bar at varying distances from the fixed jaw, and in which a force amplifying arrangement is provided, characterised in that the force amplifying arrangement (5) includes one cylindrical tube (9) and one clamping plunger (11) that is movably disposed in the cylindrical tube (9), and that a high-pressure chamber (14) acting on the clamping plunger (11) from the direction of the drawbar is provided, which is placed under pressure directly with a pressurising medium.

16. The clamping device according to claim 15, characterised in that a device for measuring the pressure in the high-pressure chamber (14) is provided.

17. The clamping device according to claim 2, characterised in that the plungers (10, 11) are movably configured opposite one another.

18. The clamping device according to claim 3, characterised in that the plungers (10, 11) are movably configured opposite one another.

* * * * *